United States Patent Office 3,751,436
Patented Aug. 7, 1973

3,751,436
2,3-DIHYDRO - 5 - (2-METHYLENE-ALKANOYL)-BENZOFURAN - 2 - CARBOXYLIC ACID ALKYL AND CYCLOALKYL ESTERS
Ernst Habicht, Oberwil, Basel-Land, Switzerland, and Bernard Libis, Saint-Louis, France, assignors to Ciba-Geigy Corporation
No Drawing. Filed Nov. 9, 1970, Ser. No. 88,207
Int. Cl. C07d 5/36
U.S. Cl. 260—346.2 R                 5 Claims

ABSTRACT OF THE DISCLOSURE

Compounds of the class of 2,3-dihydro-5-(2-methylene-alkanoyl)-benzofuran- and 2,3-dihydro-5-(2 - methylene-alkanoyl)-benzo[b]thiophene-2-carboxylic acid alkyl and cycloalkyl esters have diuretic and saluretic effects in mammals; pharmaceutical compositions containing said compounds and methods for producing a diuretic and saluretic effect in mammals comprising administering said compounds to said mammals are described; a typical embodiment is 2,3-dihydro-5-(2-methylene-butyryl)-6-methyl-benzofuran-2-carboxylic acid methyl ester.

---

The present invention concerns heterocyclic carboxylic acid esters, processes for the production thereof, pharmaceutical compositions containing these compounds and methods of producing diuretic and saluretic effects in mammals.

More particularly, the present invention concerns compounds of the formula

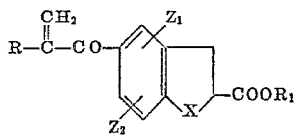

(I)

wherein

R is alkyl having at most 6 carbon atoms,
$R_1$ is alkyl having at most 10 carbon atoms or cycloalkyl having from 5 to 7 carbon atoms,
X is oxygen or sulfur, and
$Z_1$ and $Z_2$, independently of each other, are hydrogen chloro, fluoro, bromo, methyl, ethyl, methoxy or ethoxy.

These compounds have been found to possess valuable pharmacological properties. In particular, they have a diuretic and saluretic activity which is combined with a high therapeutic index. These properties characterise the compounds of the invention as being suitable for the treatment of disturbances caused by insufficient excretion of urine and of electrolytes, especially of sodium chloride. Such disturbances are the cause of edema and hypertension. The new substances administered orally in low doses to mammals increase the excretion of urine and of sodium and chlorine ions to a considerable extent.

In the heterocyclic carboxylic acid esters of Formula I, $Z_1$ is in the 4- or 6-position and $Z_2$ is in the 6- or 7-position.

R and $R_1$ as alkyl groups are, e.g., the methyl, ethyl, propyl, isopropyl, butyl, isobutyl, sec-butyl, tert-butyl, pentyl, 2-methyl-butyl, isopentyl, 2,2-dimethyl-propyl, 1-methyl-butyl, 1-ethyl-propyl, 1,2-dimethyl-propyl, tert-pentyl and hexyl groups. In addition, $R_1$ as alkyl group can be, e.g., the heptyl, octyl, nonyl or decyl group; and as cycloalkyl group, the cyclopentyl, cyclohexyl, or cycloheptyl group; and $Z_1$ as well as $Z_2$ as alkyl groups can be the methyl or ethyl group, and as alkoxy groups, the methoxy or ethoxy group.

According to a first process of the invention, compounds of Formula I are produced by decomposing a compound of the Formula II

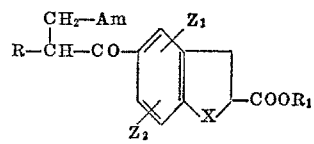

(II)

wherein

Am represents the radical of a secondary organic base, and R, $R_1$, X, $Z_1$ and $Z_2$ have the meaning given for Formula I, while splitting off an amine of the Formula III H—Am     (III)

wherein Am has the meaning given for Formula II.

As radical of a secondary organic base, Am can be, e.g., the dimethylamino, diethylamino, 1 - pyrrolidinyl, piperidino, hexahydro-1H-azepin-1-yl or the morpholino group.

The decomposition can take place at a reaction temperature of about 20 to 120° C., preferably in the presence of a catalytic amount of a weak base in a solvent possessing hydroxyl groups. Suitable as weak bases are, e.g., sodium acetate or sodium hydrogen carbonate; they are preferably employed in glacial acetic acid or water.

Suitable starting materials of Formula II are, e.g., those compounds whose groups R, $R_1$, X, $Z_1$ and $Z_2$ correspond to the groups specified following Formula I. These starting materials can be produced, for example, as follows: carboxylic acids of the Formula IIa

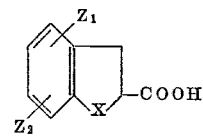

(IIa)

wherein X, $Z_1$ and $Z_2$ have the meaning given for Formula I are used as starting compounds. Compounds described in the literature, which are embraced by Formula IIa are, e.g., 2,3-dihydro-6-methoxy-benzofuran-2-carboxylic acid [cf. W. Will and P. Beck, Chem. Ber. 19, 1783 (1886)] and 2,3-dihydro-3,6-dimethyl-benzofuran-carboxylic acid [cf. K. Fries and G. Fickewirth, Ann. Chem. 362, 49 (1908)]. Other 2,3-dihydro-benzofuran derivatives of this type can be produced analogously. In addition, 6-ethoxy-benzo[b]thiophene-2-carboxylic acid, described in the literature [cf. E. Campaigne and W. Kreighbaum, J. Org. Chem. 26, 363–365 (1961)], can, e.g., be reduced with sodium amalgam in saturated sodium hydrogen carbonate solution to 2,3-dihydro-6-ethoxy-benzo[b]thiophene-2-carboxylic acid which is also embraced by Formula IIa. Other 2,3-dihydro-benzo[b]thiophene derivatives of this type can be obtained analogously. The compounds of Formula IIa can be converted with oxalyl chloride into the corresponding carbonyl chlorides, which with compounds of the Formula IIb, $R_1$—OH     (IIb)

wherein $R_1$ has the meaning given for Formula I, in the presence of N,N-diisopropyl-ethylamine in benzene yield carboxylic acid esters of the Formula IV which are starting materials for the second process. The methyl esters which fall under Formula IV can also be produced from the free acids with diazomethane in chloroform/ether. The esters obtained are then condensed according to Friedel-Crafts, e.g. in the presence of aluminium chloride in nitrobenzene, with carbonyl chlorides of the Formula IIc,

wherein R has the meaning given for Formula I, to compounds of the Formula IId

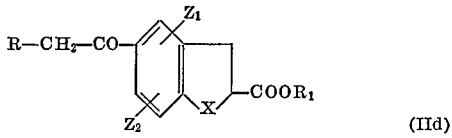

wherein R, $R_1$, X, $Z_1$ and $Z_2$ have the meaning given for Formula I. The reaction products obtained are then converted with the aid of formaldehyde or paraformaldehyde and a salt of a secondary organic base into the corresponding salts of Mannich derivatives of the Formula II. The bases of the Formula II can be liberated from these salts using a base, e.g. sodium acetate.

Compounds of Formula I are produced by a second process according to the invention by reacting, according to Friedel-Crafts, a compound of the Formula IV

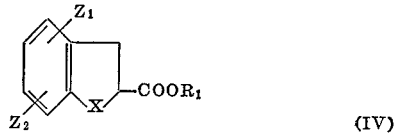

wherein $R_1$, X, $Z_1$ and $Z_2$ have the meaning given for Formula I, with a carbonyl halide of the Formula V

or with a carboxylic acid anhydride of the Formula VI

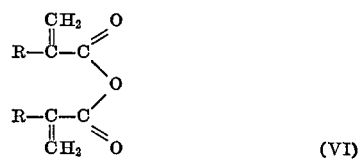

wherein

R has the meaning given for Formula I and
Q represents a halogen atom.

As halogen, Q is preferably chlorine or bromine. The reaction according to Friedel-Crafts is performed at a reaction temperature of from 0° to 60° C. Suitable catalysts for the reaction are, for example, metal salts such as aluminium chloride and tin(IV) chloride, in addition zinc chloride and acids such as concentrated sulfuric acid, phosphoric acid, polyphosphoric acid or pyrophosphoric acid. The aforesaid acids are preferred when the acylating agent is a carboxylic acid anhydride. Furthermore, the process according to the invention is preferably performed in a solvent. As solvent, the following, for example, may be employed: aliphatic or cycloaliphatic hydrocarbons such as heptane or cyclohexane, nitro-hydrocarbons such as nitromethane, nitrocyclohexane or nitrobenzene, or halo-hydrocarbons such as carbon tetrachloride, ethylene chloride, methylene chloride, o-dichlorobenzene, in addition carbon disulfide or an excess of the acylating agent.

The production of the starting materials of the Formula IV have already been discussed following the first process.

Compounds of the Formula I are produced by a third process according to the invention by dehalogenating a compound of the Formula VII

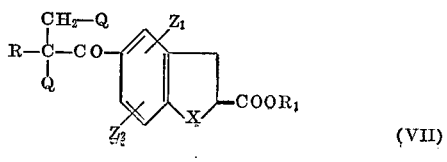

wherein

R, $R_1$, X, $Z_1$ and $Z_2$ have the meaning given for Formula I, and
Q represents a halogen.

As halogen, Q is preferably chlorine or bromine. The dehalogenation can be performed with the aid of metals such as, e.g., copper, magnesium, aluminium, iron and, in particular, zinc dust. Since the dehalogenation is usually a pronounced exothermic reaction, it is advantageously performed in a solvent. The reaction temperature is between about 20 and 150° C., preferably at the boiling point of the reaction mixture. When zinc powder is used as dehalogenating agent, suitable solvents are, e.g., lower alkanols such as methanol or ethanol. Besides the metallic dehalogenating agents, non-metallic ones, e.g. alkali-metal iodides, are also suitable. For example, sodium or potassium iodide may be mentioned, which likewise are preferably employed in a solvent. Suitable solvents are, for example, lower alkanols such as methanol or ethanol, or lower alkanones such as acetone or methyl ethyl ketone.

Compounds which can be used as starting materials of Formula VII are, for example, those whose radicals Q, R, $R_1$, X, $Z_1$ and $Z_2$ correspond to those specified following Formula I and Formula VII. Such compounds are obtained, for example, starting from carboxylic acid esters of Formula IV which are starting materials for the second process according to the invention. These carboxylic acid esters can be acylated in 5-position, e.g. according to Friedel-Crafts with the aid of aluminium chloride in nitrobenzene with carboxylic acid chlorides of the Formula VIIa

wherein

R has the meaning given for Formula I and
Q represents a halogen preferably chlorine or bromine.

Compounds of Formula I are produced by a fourth process according to the invention by converting a compound of the Formula VIII

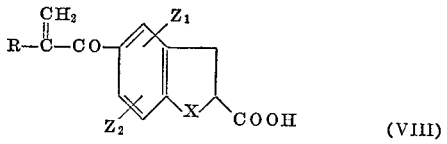

wherein

R, X, $Z_1$ and $Z_2$ have the meaning given for Formula I, or a reactive functional derivative of such a carboxylic acid into a carboxylic acid ester.

For example, a carboxylic acid of Formula VIII or a reactive functional derivative of such is reacted with a hydroxy compound of the Formula IIb

wherein $R_1$ has the meaning given for Formula I.

When starting from the free carboxylic acid, this esterification is preferably performed in the presence of a catalyst in a solvent at a temperature of about 20 to 250° C. Suitable catalysts are, for example, mineral acids such as hydrogen chloride, concentrated sulfuric acid or phosphoric acid, in addition aromatic sulfonic acids such as benzene- or p-toluene-sulfonic acid, and acid chlorides such as thionyl chloride, acetyl chloride, or chloroformates, as well as boron trifluoride. As solvent an excess of alcohol and/or an inert solvent is used. Suitable inert solvents are, for example, hydrocarbons such as benzene, toluene or xylene, in addition chlorinated hydrocarbons such as chloroform or carbon tetrachloride.

The yield of reaction product can optionally be increased when the water formed during the reaction is removed from the reaction equilibrium, e.g. by azeotropic distillation or by using a water-binding agent such as copper sulphate, iron sulphate or zinc sulphate.

Instead of the free carboxylic acids of Formula VIII, the corresponding carbonyl halides, in particular the chlorides, can be employed in the process. When a molar equivalent of carbonyl halide is reacted with a molar equivalent of alcohol, one molar equivalent of hydrogen halide is split off. The hydrogen halide is preferably bound by an acid-binding agent and the reaction is performed in a solvent or diluent. Suitable acid-binding agents are, for example, inorganic bases such as alkali-metal carbonates, and in particular tertiary organic bases such as pyridine or N,N-diisopropyl-ethylamine, which optionally may be employed in excess. Suitable solvents or diluents are, for example, hydrocarbons such as benzene, toluene or xylene, alkanones such as acetone or methyl ethyl ketone, ether-type liquids such as ether or dioxane, excess alcohol, or excess tertiary organic bases. Depending on the starting products used, the reaction is more or less exothermic; it can be completed by heating to about 30 to 150° C.

According to a modification of the process of the invention, the free carboxylic acid of Formula VIII can also be esterified with a diazo-alkane, e.g. with diazomethane. The reaction, during which nitrogen is split off, is preferably performed in a solvent. Suitable solvents are, e.g., ether-type liquids such as ether or dioxane, halogenated hydrocarbons such as chloroform, or alkanols such as isopropanol.

Furthermore, according to the invention salts of carboxylic acids of Formula VIII can be reacted with reactive esters of compounds of Formula IIb. Suitable salts are alkali-metal and alkaline earth-metal salts, in addition lead salts; suitable reactive esters are halides, e.g. iodides, or sulfates, e.g. dimethyl sulfate. The reaction is preferably performed in solvents or diluents. Suitable solvents and diluents are hydrocarbons such as benzene, toluene or xylene, ether-type liquids such as ether, chlorinated hydrocarbons such as chloroform, alkanones such as acetone and water.

The starting materials of the process, the compounds of Formula VIII, are produced, for example, as follows: compounds of the Formula IIa are used as starting compounds which are condensed according to Friedel-Crafts with alkanoyl halides of Formula IIc in the presence of aluminium chloride in nitrobenzene to the corresponding 2,3-dihydro-5-alkanoyl-benzofuran-2-carboxylic acids or to 2,3-dihydro-5-alkanoyl-benzo[b]thiophene-2-carboxylic acids. The condensation products obtained are then converted, for example according to Mannich with paraformaldehyde and dimethylamine hydrochloride in dioxane, into the corresponding 2,3-dihydro-5-(2-dimethylamino-ethyl-alkanoyl)-benzofuran - 2 - carboxylic acid-hydrochlorides or 2,3 - dihydro-5-(2-dimethylaminomethylalkanoyl) - benzo]b]thiophene-2-carboxylic acid-hydrochlorides, which are decomposed by weak bases, e.g. by sodium acetate in glacial acetic acid, while splitting off dimethylamine.

The diluretic and saluretic effects of the compounds of the invention are illustratively demonstrated in dogs. Thus it can be shown by conventional pharmacological experiments [cf. E. G. Stenger et al., Schweiz. med. Wochenschr. 89, 1126 (1959)] that for example 2,3-hydro-5-(2 - methyl-butyryl)-6-methyl-benzofuran-2-carboxylic acid methyl ester, the corresponding ethyl and decyl esters and 2,3 - dihydro-5-(2-methylene-butyryl)-6,7-dimethylbenzofuran-2-carboxylic acid methyl ester upon oral administration in amounts of about 5 mg./kg. to dogs increase the excretion of urine and simultaneously of sodium chloride to a considerable extent, whereby no undesirable side effects are observed.

The new active substances are preferably administered orally. The daily doses are between 0.5 and 10 ml./kg. for mammals. Suitable dosage unit forms such as dragées and tablets contain preferably 5 to 100 mg. of an active substance according to the invention, namely 20 to 90% of a compound of the Formula I. They are produced by combining the active substance with e.g., solid, pulverulent carriers, such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols, to form tablets or dragée cores. The latter are coated, e.g. with concentrated sugar solutions which can also contain, e.g. gum arabic, talcum and/or titanium dioxide, or with a lacquer dissolved in readily volatile organic solvents or mixtures of solvents. Dyestuffs can be added to these coatings, e.g. to distinguish between varying dosages of active substance. Other suitable dosage units for oral administration are hard gelatine capsules and also soft, closed capsules made of gelatine and a softener such as glycerin. The former preferably contain the active substance as a granulate in admixture with lubricants such as talcum or magnesium stearate, and optionally stabilizers such as sodium metabisulfite or ascorbic acid. In soft capsules, the active substance is preferably dissolved or suspended in suitable liquids such as liquid polyethylene glycols to which stabilizers may also be added.

The following prescriptions illustrate more in detail the production of tablets, dragées and capsules:

(a) 1000 gr. of 2,3-dihydro-5-(2-methylene-butyryl)-6-methyl-benzofuran-2-carboxylic acid methyl ester are mixed with 550 g. of lactose and 292 g. of potato starch. The mixture is moistened with an aqueous solution of 8 g. of gelatine and granulated through a sieve. After the granulate has been dried, 60 g. of potato starch, 60 g. of talcum, 10 g. of magnesium stearate and 20 g. of colloidal silicon dioxide are mixed in and the mixture is pressed into 10,000 tablets, each weighing 200 mg. and each containing 100 mg. of active substance. Optionally, the tablets can be provided with grooves for more precise adjustment of the dosage amount.

(b) A granulate is prepared from 1000 g. of 2,3-dihydro-5-(2-methylene-butyryl) - 6 - methyl-benzofuran-2-carboxylic acid methyl ester, 379 g. of lactose and the aqueous solution of 6 g. of gelatine. After drying, the granulate is mixed with 10 g. of colloidal silicon dioxide, 40 g. of talcum 60 g. of potato starch and 5 g. of magnesium stearate. From the mixture there are pressed 10,000 dragée cores which are subsequently coated with a concentrated syrup consisting of 533.5 g. of crystalline saccharose, 20.g. of shellac, 75 g. of gum arabic, 250 g. of talcum, 20 g. of colloidal silicon dioxide and 1.5 g. of dyestuff and dried. The dragées obtained each weight 240 mg. and each contain 100 mg. of active susbtance.

(c) To produce 1000 capsules each containing 100 mg. of active substance, 100 g. of 2,3-dihydro-5-(2-methylene-butyryl)-6-methyl-benzofuran - 2 - carboxylic acid methyl ester are mixed with 9.5 g. of talcum and 0.5 g. of magnesium stearate. The mixture is pressed through a sieve (e.g. sieve IV, Ph. Helv. V.) and then evenly filled into capsules, size 0.

(d) To produce 1000 capsules each containing 50 mg. of active substance, 50 g. of 2,3-dihydro-5-(2-methylene-butyryl)-6-methyl-benzofuran -2 - carboxylic acid methyl ester are mixed with 14 g. of a wax mixture consisting of 1 part of beeswax DAB 6, 1 part of hydrogenated soybean oil and 4 parts of partially hydrogenated vegetable oils, as well as with 20 g. of lecithin, 215.55 g. of peanut oil DAB 6, 0.15 g. of butylcresol and 0.30 g. of 10% citric acid solution. The mixture is filled into soft gelatine capsules, size 6 minim.

The same amount of one of the following compound may also be used a active substance for the tablets, capsules and dragées:

2,3-dihydro-5-(2-methylene-butyryl)-6,7-dimethyl-benzofuran-2-carboxylic acid methyl ester,
2,3-dihydro-5-(2-methylene-3-methyl-butyryl)-6-methyl-benzofuran-2-carboxylic acid methyl ester and
2,3-dihydro-5-(2-methylene-butyryl)-6-methyl-benzofuran-2-carboxylic acid decyl ester.

The following examples illustrate more in detail the production of the new compounds of the general Formula I and of intermediates which have not been previously described; they are, however, not to be considered to limit the invention in any way. The temperatures are given in degrees centigrade.

EXAMPLE 1

(a) 21.0 g. of anhydrous sodium acetate and 200 ml. of glacial acetic acid are added to 33 g. of crude 2,3-dihydro-5-(2-dimethylamino-methyl-butyryl) - 6 - methyl-benzofuran-2-carboxylic acid methyl ester hydrochloride. The mixture obtained is refluxed with stirring for 2 hours and then evaporated under vacuum. The residue is stirred with 100 ml. of water, the resultant suspension is adjusted to a pH of 2 with concentrated hydrochloric acid and stirred for 5 minutes at 20°. The carboxylate is extracted by shaking it three times with 150 ml. of ether. The ether solution is dried over sodium sulphate and concentrated by evaporation. The residue is distilled in a high vacuum. The 2,3-dihydro-5-(2-methylene-butyryl)-6-methyl-benzofuran-2-carboxylic acid methyl ester boils at 158–161°/0.06 torr; yield 13.5 g., 61% of theory calculated on the starting product from (e).

The starting material, the 2,3-dihydro-5-(2-dimethyl-aminomethyl-butyryl) - 6-methyl-benzofuran-2-carboxylic acid methyl ester hydrochloride, is produced as follows:

(b) 35.0 g. of 6-methyl-benzofuran-2-carboxylic acid [cf. K. von Auwers, Ann. Chem. 408, 255 (1915)] are dissolved in 500 ml. of a saturated aqueous sodium hydrogen carbonate solution and cooled to 5° in an ice bath. 500.0 g. of 5% sodium amalgam are added; after 2 hours the reaction mixture is removed from the ice bath and allowed to stand for 24 hours at 20°. Then the solution is separated from the mercury and filtered. After the filtrate is adjusted to a pH of 1 with concentrated hydrochloric acid, the precipitate which separates is removed by filtration, washed with 300 ml. of water and dried. The resultant 2,3-dihydro-6-methyl-benzofuran-2-carboxylic acid melts at 157° and after recrystallization from methanol/water at 158°.

(c) 17.8 g. of the carboxylic acid obtained according to (b) are dissolved in 100 ml. of chloroform. The solution is treated with excess diazomethane dissolved in ether. The ether/chloroform solution is concentrated by evaporation, and the oily residue is recrystallized from methanol/water. The 2,3-dihydro-6-methyl-benzofuran-2-carboxylic acid methyl ester obtained melts at 32°; yield 17.3 g., 90% of theory.

(d) 50 ml. of nitrobenzene are added to 19.2 g. of the carboxylate obtained according to (c). During 30 minutes with stirring and cooling, 50.0 g. of aluminium chloride are added in portions in such a manner that the temperature does not exceed 10°. At the same temperature during 30 minutes, 16.0 g. of butyryl chloride are added dropwise. The reaction mixture is then stirred for 5 hours in an ice bath, allowed to stand for 16 hours at room temperature, heated for one hour to 40° and poured onto 500.0 g. of ice. 50 ml. of concentrated hydrochloric acid are added to the resultant suspension. After the aluminium chloride complex has decomposed, the reaction mixture is extracted three times with 150 ml. each of ether. The ether extract is dried over sodium sulphate and concentrated by evaporation. The residue is chromatographed by the elution method on a column of 900 g. of silica gel (Merck®, granular size 0.05–0.2 mm.). A mixture of chloroform/heptane/ethyl acetate (10:10:1) is used as eluant. The combined fractions of the crude product are evaporated under vacuum. The residue is crystallized from methanol/water. The 2,3-dihydro-5-butyryl-6-methyl-benzofuran-2-carboxylic acid methyl ester obtained melts at 38–39°; yield 21.3 g., 82% of theory.

(e) 21.0 g. of the ester obtained according to (d) are refluxed with stirring for 4 hours with 4.1 g. of paraformaldehyde and 8.2 g. of dimethylamine hydrochloride in 125 ml. of dioxane. The reaction mixture is then concentrated under vacuum. The residue is heated with stirring for 2 hours at 100° and 33 g. of crude 2,3-dihydro-5-(2-dimethylaminomethyl-butyryl) - 6 - methyl-benzofuran-2-carboxylic acid methyl ester hydrochloride are obtained.

EXAMPLE 2

(a) Analogously to Example 1(a), from 37 g. of crude 2,3-dihydro - 5 - (2 - dimethylaminomethyl-butyryl)-6-methyl-benzofuran-2-carboxylic acid butyl ester hydrochloride with 21 g. of anhydrous sodium acetate, there are obtained 17.7 g. of 2,3-dihydro-5-(2-methylene-butyryl)-6-methyl-benzofuran-2-carboxylic acid butyl ester having B.P. 176–180°/0.02 torr, yield 70% of theory calculated on the starting material from (d)

The 2,3-dihydro-5-(2-dimethylaminomethyl-butyryl)-6-methyl-benzofuran-2-carboxylic acid butyryl ester hydrochloride used as starting product is produced as follows:

(b) 17.8 g. of 2,3-dihydro-6-methyl-benzofuran-2-carboxylic acid are dissolved in 62.5 g. of oxalyl chloride. The solution is evaporated under vacuum, the residue is treated with benzene and the benzene is evaporated under vacuum. Then 50 ml. of benzene and 15.0 g. of butanol are added to the residue, the crude 2,3-dihydro-6-methyl-benzofuran-2-carbonyl chloride, and the solution is cooled to 0°. At this temperature, 13.0 g. of N,N-disopropyl-ethylamine are added dropwise and the mixture is heated for one hour at 50°. The reaction mixture is cooled, poured onto ice, and the crude product is extracted with ether. The ether solution is washed with water, with 2 N hydrochloric acid, with saturated aqueous sodium hydrogen carbonate solution and with water, then dried over sodium sulphate and concentrated by evaporation. The residue is purified by chromatography on a column of 300 g. of silica gel (Merck®, granular size 0.05–0.2 mm.). A mixture of benzene/ethyl acetate (100:3) is used as eluant. The fractions containing the crude product are concentrated by evaporation and the residue is distilled in high vacuum. 14.0 g. of 2,3-dihydro-6-methyl-benzofuran-2-carboxylic acid butyl ester B.P. 96–99°/0.01 torr, are obtained; yield 60% of theory.

(c) 23.4 g. of the ester obtained according to (b) are reacted analogously to Example 1(d) with 50.0 g. of aluminium chloride and 16.0 g. of butyryl chloride in 50 ml. of nitrobenzene. 25.8 g. of 2,3-dihydro-5-butyryl-6-methyl-benzofuran-2-carboxylic acid butyl ester, B.P. 161°/0.005 torr, are obtained; yield 84% of theory.

(d) 24.3 g. of the ester obtained according to (c) are converted analogously to Example 1(e) with 4.1 g. of paraformaldehyde and 8.2 g. of dimethylamine hydrochloride to 37 g. of crude 2,3-dihydro-5-(2-dimethylaminomethyl-butyryl) - 6 - methyl-benzofuran-2-carboxylic acid butyl ester hydrochloride.

EXAMPLE 3

(a) 34 g. of crude 2,3-dihydro-5-(2-dimethyl-aminomethylbutyryl)-6-methyl-benzofuran - 2 - carboxylic acid ethyl ester hydrochloride, analogously to Example 1(a) with 21 g. of anhydrous sodium acetate, yield 16.8 g. of 2,3-dihydro-5-(2-methylene-butyryl) - 6 - methyl-benzofuran-2-carboxylic acid ethyl ester M.P. 40–41°; yield 73% of theory calculated on the starting material obtained from (d).

The 2,3 - dihydro-5-(2-dimethylaminomethyl-butyryl)-6-methyl-benzofuran-2-carboxylic acid ethyl ester hydrochloride required as starting material is produced as follows:

(b) Analogously to Example 2(b), from 17.8 g. of 2,3-dihydro-6-methyl-benzofuran-2-carboxylic acid and 62.5 g. of oxalyl chloride, there is obtained 2,3-dihydro-6-methylbenzofuran-2-carbonyl chloride, which is reacted with 9.2 g. of ethanol and 13.0 g. of N,N-diisopropylethyl-amine to obtain 2,3-dihydro-6-methyl-benzofuran-2-carboxylic acdi ethyl ester, M.P. 57–58° (from hexane); yield 15.9 g., 77% of theory.

(c) 20.6 g. of the ester obtained according to (b), analogously to Example 1(d), with 50.0 g. of aluminium chloride and 16.0 g. of butyryl chloride in 50 ml. of nitrobenzene yield 2,3-dihydro-5-butyryl-6-methyl-benzofuran-2-carboxylic acid ethyl ester, M.P. 57–58° (from hexane); water); yield 24 g., 87% of theory.

(d) Analogously to Example 1(e), 22.1 g. of the ester obtained according to (c) with 4.1 g. of paraformaldehyde and 8.2 g. of dimethylamine hydrochloride are converted into 34 g. of crude 2,3-dihydro-5-(2-dimethylaminomethyl-butyryl)-6-methylbenzofuran - 2-carboxylic acid ethyl ester hydrochloride.

EXAMPLE 4

(a) Analogously to Example 1(a), from 43 g. of crude 2,3-dihydro - 5 - (2-dimethylaminomethyl-butyryl)-6-methyl-benzofuran-2-carboxylic acid decyl ester hydrochloride with 21.0 g. of anhydrous sodium acetate, there are obtained 26 g. of 2,3-dihydro-5-(2-methylene-butyryl)-6-methyl-benzofuran-2-carboxylic acid decyl ester, B.P. 227°/0.05 torr; yield 65% of theory calculated on the starting material from (d).

The 2,3-dihydro-5-(2 - dimethylaminomethyl-butyryl)-6-methyl-benzofuran-2-carboxylic acid decyl ester hydrochloride, used as starting material, is produced as follows:

(b) Analogously to Example 2(b), from 17.8 g. of 2,3-dihydro-6-methyl-benzofuran-2-carboxylic acid and 62.5 g. of oxalyl chloride, there is obtained the crude 2,3-dihydro-6-methyl-benzofuran - 2 - carbonyl chloride, which, together with 31.6 g. of decanol and 13.0 g. of N,N-diisopropylethylamine, yields 2,3-dihydro-6-methyl-benzofuran-2-carboxylic acid decyl ester, M.P. 42–43° (from methanol/water); yield 27 g., 85% of theory.

(c) Analogously to Example 1(d), 31.8 g. of the decyl carboxylate obtained according to (b) are reacted with 16.0 g. of butyryl chloride to obtain 2,3-dihydro-5-butyryl-6-methylbenzofuran-2-carboxylic acid decyl ester, M.P. 44–45° (from methanol); yield 31.5 g., 81% of theory.

(d) Analogously to Example 1(e), 31.2 g. of the ester obtained according to (c) are converted with 4.1 g. of paraformaldehyde and 8.2 g. of dimethylamine hydrochloride to 43 g. of crude 2,3-dihydro-5-(2-dimethylaminomethyl-butyryl)-6-methyl-benzofuran - 2 - carboxylic acid decyl ester hydrochloride.

EXAMPLE 5

(a) Analogously to Example 1(a), 39 g. of crude 2,3-dihydro-5-(2 - dimethylaminomethyl - butyryl)-6-methyl-benzofuran-2-carboxylic acid cyclohexyl ester hydrochloride with 21.0 g. of anhydrous sodium acetate yield 18.5 g. of 2,3-dihydro-5-(2-methylene-butyryl)-6-methyl-benzofuran-2-carboxylic acid cyclohexyl ester B.P. 187–190.5°/0.05 torr; yield 68% of theory calculated on the starting product from (d).

The 2,3-dihydro - 5 - (2-dimethylaminomethyl-butyryl)-6-methyl-benzofuran-2-carboxylic acid cyclohexyl ester hydrochloride, used as starting material, is produced as follows:

(b) Analogously to Example 2(b), from 17.8 g. of 2,3-dihydro-6-methyl-benzofuran-2-carboxylic acid and 62.5 g. of oxalyl chloride, there is obtained the crude 2,3-dihydro - 6 - methyl-benzofuran-2-carbonyl chloride, which, with 20.0 g. of cyclohexanol and 13.0 g. of N,N-diisopropyl-ethylamine, yields 2,3-dihydro-6-methyl-benzofuran-2-carboxylic acid cyclohexyl ester M.P. 49–50° (from methanol/water); yield 23.7 g., 91% of theory.

(c) Analogously to Example 1(d), 26.0 g. of the ester obtained according to (b) are reacted with 16.0 g. of butyryl chloride. 30 g. of 2,3-dihydro-5-butyryl-6-methyl-benzofuran-2-carboxylic acid cyclohexyl ester M.P. 102–103° (from methanol) are obtained; yield 90% of theory.

(d) Analogously to Example 1(e), 26.4 g. of the ester obtained according to (c) are converted with 4.1 g. of paraformaldehyde and 8.2 g. of dimethylamine hydrochloride to 39 g. of crude 2,3-dihydro-5-(2-dimethylaminomethyl-butyryl)-6-methylbenzofuran - 2 - carboxylic acid cyclohexyl ester hydrochloride.

EXAMPLE 6

(a) Analogously to Example 1(a), 34 g. of crude 2,3-dihydro-5-(2-dimethylaminomethyl - 3 - methyl-butyryl)-6-methyl-benzofuran-2-carboxylic acid methyl ester hydrochloride and 21.0 g. of anhydrous sodium acetate yield 16.5 g. of 2,3-dihydro-5-(2-methylene-3-methyl-butyryl)-6-methyl-benzofuran-2-carboxylic acid methyl ester B.P. 145–147°/0.005 torr; yield 72% of theory, calculated of the starting material from (c).

The 2,3-dihydro-5-(2-dimethylaminomethyl-3-methyl-butyryl)-6-methyl-benzofuran-2-carboxylic acid methyl ester hydrochloride used as starting material is produced as follows:

(b) Analogously to Example 1(d), from 19.2 g. of 2,3-dihydro - 6 - methyl-benzofuran - 2 - carboxylic acid methyl ester and 18.0 g. of 3-methyl-butyryl chloride there is obtained 2,3-dihydro-5-(3-methyl-butyryl)-6-methyl-benzofuran-2-carboxylic acid methyl ester, B.P. 147–151°/0.01 torr; yield 21.5 g., 78% of theory.

(c) Analogously to Example 1(e), 22.1 g. of the carboxylate obtained according to (b) are converted with 4.1 g. of paraformaldehyde and 8.2 g. of dimethylamine hydrochloride into 34 g. of crude 2,3-dihydro-5-(2-dimethylaminomethyl - 3 - methyl-butyryl)-6-methyl-benzofuran-2-carboxylic acid methyl ester hydrochloride.

EXAMPLE 7

(a) Analogously to Example 1(a), from 34 g. of crude 2,3-dihydro - 5 - (2-dimethylaminomethyl-butyryl)-6,7-dimethyl-benzofuran-2-carboxylic acid methyl ester hydrochloride and 21.0 g. of anhydrous sodium acetate there are obtained 19.0 g. of 2,3-dihydro-5-(2-methylene-butyryl)-6,7-dimethyl-benzofuran - 2 - carboxylic acid methyl ester, M.P. 50° (from methanol/water); yield 83% of theory, calculated on the starting product from (g).

The 2,3 - dihydro-5-(2-dimethylaminomethyl-butyryl)-6,7 - dimethyl-benzofuran-2-carboxylic acid methyl ester hydrochloride used as starting material is produced as follows:

(b) 45.0 g. of 2,3-dimethyl-phenol and 50.0 g. of malic acid are pulverized and mixed well; 100 ml. of concentrated sulphuric acid are added to the mixture and slowly heated with stirring, so that at the end of 30 minutes the temperature is 130°. The solution is kept for 30 minutes longer at this temperature and then poured onto 1 kg. of ice; the resultant suspension is stirred for 30 minutes. The crystals which precipitate are suction filtered and recrystallized from ethanol. 7,8-dimethyl-coumarin, M.P. 128–130°, is obtained; yield 36.3 g., 56% of theory.

(c) 34.8 g. of the coumarin obtained under (b) are dissolved in 60 ml. of chloroform. A solution of 32.5 g. of bromine in 20 ml. of chloroform is added dropwise to the above solution with stirring and intermittent cooling with ice so that the reaction temperature is kept between 20 and 25°. The mixture is stirred for 20 minutes more at room temperature, and then the chloroform is completely removed by evaporation under vacuum. The residue is added in portions to a mixture of 90.0 g. of potassium hydroxide and 300 ml. of ethanol, and the reaction temperature is kept between 30 and 40° by cooling with ice. The mixture is then stirred for 30 minutes at 40° and for 30 minutes at 80°, and then poured onto 2 liters of ice water. The aqueous, alkaline solution is washed twice with 400 ml. each of ether and then adjusted to a pH of 2–3 with concentrated hydrochloric acid. The suspension obtained is stirred for half an hour at room temperature. The crystals which precipitate are suction filtered and recrystallized from ethanol. 6,7-dimethyl-benzofuran-2-carboxylic acid, M.P. 237–239°, is obtained.

(d) Analogously to Example 1(b), 38 g. of the carboxylic acid obtained according to (c) are reduced with 500 g. of 5% sodium amalgam to obtain 34 g. of 2,3-dihydro-6,7 - dimethyl-benzofuran-2-carboxylic acid, M.P. 182° (from ethanol); yield 89% of theory.

(e) Analogously to Example 1(c), 19.2 g. of the carboxylic acid produced according to (d) are converted with diazomethane into 18.3 g. of 2,3 - dihydro-6,7-dimethyl-benzofuran-2-carboxylic acid methyl ester, M.P. 49–50°; yield 95% of theory.

(f) Analogously to Example 1(d), 20.6 g. of the ester obtained according to (e) with 16.0 g. of butyryl chloride yield 22 g. of 2,3 - dihydro-5-butyryl-6,7-dimethyl-benzofuran - 2 - carboxylic acid methyl ester, M.P. 39° (from methanol/water); yield 80% of theory.

(g) Analogously to Example 1(e), 22.1 g. of the ester obtained according to (f) are converted with 4.1 g. of paraformaldehyde and 8.2 g. of dimethylamine hydrochloride into 34 g. of crude 2,3-dihydro-5-(2-dimethyl-aminomethyl-butyryl) - 6,7 - dimethyl-benzofuran-2-carboxylic acid methyl ester hydrochloride.

EXAMPLE 8

(a) Analogously to Example 1(a), from 36 g. of crude 2,3 - dihydro - 5 - (2 - dimethylaminomethyl-butyryl)-6-chloro-7-methyl-benzofuran-2-carboxylic acid methyl ester hydrochloride and 21.0 g. of anhydrous sodium acetate, there are obtained 21.0 g. of 2,3-dihydro-5-(2-methylene-butyryl)-6-chloro - 7 - methyl-benzofuran - 2 - carboxylic acid methyl ester, M.P. 57–61° (from methanol/water); yield 85% of theory, calculated on the starting product from (g).

The starting material, 2,3-dihydro-5-(2-dimethylamino-methyl - butyryl)-6-chloro-7-methyl-benzofuran - 2 - carboxylic acid methyl ester hydrochloride, is produced as follows:

(b) 30 g. of 2-methyl-3-chloro-phenol [cf. F. Ullmann and L. Panchoud, A. 350, 108 (1906)], 28.6 g. of malic acid and 57 ml. of concentrated sulphuric acid are heated with stirring to 90–100° until no more development of carbon monoxide can be detected. The reaction mixture is then poured onto ice, and the crude product is extracted with ether. The ethereal solution is concentrated by evaporation, and the residue is recrystallized from ethanol. 7-chloro-8-methyl-coumarin, M.P. 143°, is obtained; yield 19.3 g.

(c) 17.2 g. of the coumarin produced according to (b) are suspended in 35 ml. of chloroform. 4.7 ml. of bromine in 10 ml. of chloroform are added dropwise at 25° during 20 minutes to the resultant suspension. The reaction mixture is stirred for 30 minutes longer; it is then evaporated under vacuum. The residual oil is added dropwise with stirring to a solution of 39.5 g. of potassium hydroxide in 120 ml. of ethanol so that the temperature does not exceed 40°. Stirring is continued for 30 minutes at 25° and for 30 minutes at 80°. The suspension is then poured onto ice. The solution obtained is adjusted to a pH of 7 with 4 N sulphuric acid, washed with ether, and concentrated hydrochloric acid is added to obtain an acid reaction to Congo red. The crude carboxylic acid which precipitates is extracted with ether; the ether solution is dried over sodium sulphate and evaporated. The residue is crystallized from cyclohexane/ethyl acetate, whereupon the 6-chloro-7-methyl-benzofuran-2-carboxylic acid melts at 225°.

(d) Analogously to Example 1(b), 41.5 g. of the carboxylic acid obtained according to (c) are reduced with 500 g. of 5% sodium amalgam to yield 39.6 g. of 2,3-dihydro-6-chloro - 7 - methyl-benzofuran-2-carboxylic acid, M.P. 133° (from cyclohexane/ethyl acetate); yield 93% of theory.

(e) Analogously to Example 1(c), 21.3 g. of the carboxylic acid obtained according to (d) are esterified with diazomethane to obtain 19.2 g. of 2,3-dihydro-6-chloro-7-methyl-benzofuran-2-carboxylic acid methyl ester, M.P. 52–55° (from methanol/water); yield 85% of theory.

(f) Analogously to Example 1(d), 22.7 g. of the ester obtained according to (e) with 16.0 g. of butyryl chloride yield 26 g. of 2,3 - dihydro-5-butyryl-6-chloro-7-methyl-benzofuran-2-carboxylic acid methyl ester M.P. 50–51° (from methanol/water); yield 87% of theory.

(g) Analogously to Example 1(e), 23.7 g. of the ester obtained according to (f) with 4.1 g. of paraformaldehyde and 8.2 g. of dimethylamine hydrochloride are converted to 36 g. of crude 2,3-dihydro-5-(2-dimethylaminomethyl-butyryl) - 6-chloro-7-methyl-benzofuran - 2 - carboxylic acid methyl ester hydrochloride.

EXAMPLE 9

(a) Analogously to Example 1(a), from 27 g. of crude 2,3-dihydro-5-(2-dimethylaminomethyl-butyryl) - 6 - ethoxybenzo[b]thiophene-2-carboxylic acid methyl ester hydrochloride and 21.0 g. of anhydrous sodium acetate, there are obtained 19 g. of 2,3-dihydro-5-(2-methylene-butyryl)-6-ethoxy - benzo[b]thiophene-2-carboxylic acid methyl ester, M.P. 36–39° (from methanol/water); yield 74% of theory, calculated on the starting product from (e).

The starting material, 2,3-dihydro-5-(2-dimethylamino-butyryl) - 6 - ethoxy-benzo[b]thiophene - 2 - carboxylic acid methyl ester hydrochloride, is produced as follows:

(b) Analogously to Example 1(b), 44.0 g. of 6-ethoxy-benzo[b]thiophene-2-carboxylic acid [cf. E. Campaigne and W. Kreighbaum, J. Org. Chem. 26, 363–365 (1961)] are reduced with 500 g. of 5% sodium amalgam to 35 g. of 2,3 - dihydro-6-ethoxy-benzo[b]thiophene-2-carboxylic acid, M.P. 112–114°; yield 79% of theory.

(c) Analogously to Example 1(c), 22.4 g. of the carboxylic acid produced according to (b) are esterified with diazomethane to yield 22.8 g. of 2,3-dihydro-6-ethoxy-benzo[b]thiophene-2-carboxylic acid methyl ester, M.P. 45° (from methanol/water); yield 95% of theory.

(d) Analogously to Example 1(d), 23.8 g. of the ester produced according to (c) with 16.0 g. of butyryl chloride yield 20.4 g. of 2,3-dihydro-5-butyryl-6-ethoxy-benzo[b]thiophene-2-carboxylic acid methyl ester, M.P. 98–100° (from cyclohexane); yield 66% of theory.

(e) Analogously to Example 1(e), 24.6 g. of the ester obtained according to (d) are converted with 4.1 g. of paraformaldehyde and 8.2 g. of dimethylamine hydrochloride to 27 g. of crude 2,3-dihydro-5-(2-dimethylamino-methyl-butyryl) - 6 - ethoxy-benzo[b]thiophene - 2 - carboxylic acid methyl ester hydrochloride.

EXAMPLE 10

(a) Analogously to Example 1(a), from 34 g. of 2,3-dihydro-5-(2-dimethylaminomethyl-butyryl) - 6 - methyl-benzo[b]thiophene-2-carboxylic acid methyl ester hydrochloride and 21.0 g. of sodium acetate, there are obtained 17.7 g. of 2,3-dihydro-5-(2-methylene-butyryl)-6-methyl-benzo[b]thiophene-2-carboxylic acid methyl ester, M.P. 52° (from methanol/water); yield 77% of theory, calculated on the starting product from (e).

The starting compound, 2,3-dihydro - 5 - (2-dimethyl-aminomethyl-butyryl) - 6 - methyl-benzo[b]thiophene-2-carboxylic acid methyl ester hydrochloride, is produced as follows:

(b) Analogously to Example 1(b), 83 g. of 6-methyl-benzo[b]thiophene-2-carboxylic acid [cf. Yasuo Matsuki and Tatsuo Kanda, C.A. 62, 16172h (1965)] are reduced with 500 g. of 5% sodium amalgam to obtain 30 g. of 2,3-dihydro-6-methyl-benzo[b]thiophene - 2 - carboxylic acid, M.P. 158° (from cyclohexane); yield 85% of theory.

(c) Analogously to Example 1(c), 19.4 g. of the carboxylic acid produced according to (b) are esterified with diazomethane to obtain 20.0 g. of 2,3-dihydro-6-methyl-benzo[b]thiophene-2-carboxylic acid methyl ester, M.P. 67–68° (from methanol/water); yield 96% of theory.

(d) Analogously to Example 1(d), 20.8 g. of the ester produced according to (c) with 16.0 g. of butyryl chloride yield 23.0 g. of 2,3-dihydro-5-butyryl - 6 - methyl-benzo[b]thiophene-2-carboxylic acid methyl ester, M.P. 54–56°; yield 83% of theory.

(e) Analogously to Example 1(e), 22.2 g. of the ester obtained according to (d) are converted with 4.1 g. of paraformaldehyde and 8.2 g. of dimethylamine hydrochloride to 34 g. of crude 2,3-dihydro - 5 - (2-dimethylaminomethyl-butyryl) - 6 - methyl-benzo[b]thiophene-2-carboxylic acid methyl ester hydrochloride.

EXAMPLE 11

40 ml. of nitrobenzene are added to 7.6 g. of 2,3-dihydro-6-methyl-benzofuran - 2 - carboxylic acid methyl ester, the mixture is cooled to 0°, and 20 g. of pulverized aluminium chloride are added in portions in such a manner that the temperature does not exceed 10°. The suspension is cooled to 0°, and 8 g. of 2-methylene-butyryl chloride are added all at once. Then the mixture is heated to 25° during 20 minutes, stirred for 45 minutes at this temperature, and poured onto 200 g. of ice as well as 30 ml. of concentrated hydrochloric acid. The hydrochloric acid suspension is extracted twice with 100 ml. each of ether. The ether extract is washed with water, with concentrated sodium hydrogen carbonate solution, and with water, dried with magnesium sulfate, concentrated by evaporation, and the residue is distilled under a high vacuum. The 2,3-dihydro-5-(2-methylene-butyryl)-6-methyl-benzofuran-2-carboxylic acid methyl ester obtained boils at 158–161°/0.06 torr; yield 6 g., 54% of theory.

EXAMPLE 12

Analogously to Example 11, the following end products are obtained:

(a) Starting from 7.6 g. of methyl 2,3-dihydro-6-methylbenzofuran-2-carboxylic acid methyl ester and 9 g. of 2-methylene - 3 - methyl - butyryl chloride [cf. V. P. Gol'mov, C.A. 47, 9269c (1953)], 2,3-dihydro-5-(2-methylene-3-methyl-butyryl) - 6 - methylbenzofuran - 2 - carboxylic acid methyl ester, B.P. 145–147°/0.05 torr; yield 5.4 g., 47% of theory;

(b) Starting from 9.0 g. of 2-methylene-butyryl-chloride and 8.1 g. of 2,3-dihydro-6,7-dimethyl-benzofuran-2-carboxylic acid methyl ester, 2,3-dihydro-5-(2-methylene-butyryl) - 6,7 - dimethyl-benzofuran - 2 - carboxylic acid methyl ester, M.P. 50° (from methanol/water); yield 6 g., 52% of theory;

(c) Starting from 9.0 g. of 2-methylene-butyryl chloride and 9 g. of 2,3-dihydro-6-chloro - 7 - methyl-benzofuran-2-carboxylic acid methyl ester, 2,3-dihydro-5-(2-methylene-butyryl)-6-chloro - 7 - methyl-benzofuran - 2 - carboxylic acid methyl ester, M.P. 57–61° (from methanol/water); yield 6.8 g., 55% of theory.

(d) Starting from 9.0 g. of 2-methylene-butyryl-chloride and 8.2 g. of 2,3-dihydro-6-methyl-benzofuran carboxylic acid ethyl ester, 2,3-dihydro - 5 - (2-methylene-butyryl)-6-methyl-benzofuran - 2 - carboxylic acid ethyl ester, M.P. 40–41°, yield 5.2 g., 45% of theory.

(e) Starting from 9.0 g. of 2-methylene-butyryl-chloride and 12.7 g. of 2,3-dihydro-6-methyl-benzofuran carboxylic acid decyl ester, 2,3-dihydro - 5 - (2 - methylene-butyryl)-6-methylbenzofuran - 2 - carboxylic acid decyl ester B.P. 227°–0.05 torr, yield 6.4 g., 40% of theory.

EXAMPLE 13

(a) 4.3 g. of 2,3-dihydro-5-(2-bromo-2-bromomethyl-butyryl)-6-methyl-benzofuran - 2 - carboxylic acid methyl ester are refluxed for 10 minutes with 10 g. of potassium iodide in 50 ml. of ethanol. The mixture is cooled, excess aqueous sodium thiosulphate solution is added, and the mixture is made acid to Congo red with 2 N hydrochloric acid. The crude product is extracted with ether, and the solution is evaporated under vacuum. The residue is purified by chromatography on a column of silica gel (Merck®, granular size 0.02–0.5 mm.), using a mixture of chloroform/heptane/ethyl acetate (10:10:1) as eluant. The combined fractions of the crude product are evaporated under vacuum. The residue is distilled in a high vacuum. The 2,3-dihydro - 5-(2 - methylene - butyryl)-6-methyl-benzofuran-2-carboxylic acid methyl ester obtained boils at 158–161°/0.06 torr; yield 1.5 g., 55% of theory.

The 2,3-dihydro-5-(2-bromo-2-bromomethyl - butyryl)-6-methyl-benzofuran-2-carboxylic acid methyl ester used as starting material is produced as follows:

(b) Analogously to Example 1(d), 19.2 g. of 2,3-dihydro-6-methyl-benzofuran-2-carboxylic acid methyl ester are converted with 40 g. of 2-bromo-2-bromomethyl-butyryl chloride into 40 g. of 2,3-dihydro-5-(2-bromo-2-bromomethyl-butyryl)-6-methylbenzofuran-2-carboxylic acid methyl ester which is employed as crude product; yield 93% of theory.

EXAMPLE 14

Analogously to Example 13(a–b), the following intermediate and end products are obtained:

(a) From 19.2 g. of 2,3-dihydro-6-methyl-benzofuran-2-carboxylic acid methyl ester with 42 g. of 2-bromo-2-bromo-methyl-butyryl chloride, the crude 2,3-dihydro-5-(2-bromo-2-bromomethyl-3-methyl-butyryl) - 6 - methyl-benzofuran-2-carboxylic acid methyl ester, 4.5 g. of which are converted with 10 g. of potassium iodide to 1.2 g. of 2,3-dihydro-5-(2-methylene-3-methyl-butyryl)-6 - methyl-benzofuran-2-carboxylic acid methyl ester, B.P. 145–147°/0.005 torr; yield 42% of theory;

(b) From 20.6 g. of 2,3-dihydro-6,7-dimethyl-benzofuran-2-carboxylic acid methyl ester with 40 g. of 2-bromo-2-bromomethyl-butyryl chloride, the crude 2,3-dihydro-5-(2 - bromo - 2 - bromomethyl - butyryl) - 6,7-dimethyl-benzofuran-2-carboxylic acid methyl ester, 4.5 g. of which are converted with 10 g. of potassium iodide to 1.4 g. of 2,3-dihydro-5-(2 - methylenebutyryl) - 6,7-dimethyl benzofuran-2-carboxylic acid methyl ester, M.P. 50° (from methanol/water) yield 49% of theory; and (c) From 21.3 g. of 2,3-dihydro-6-chloro - 7 - methyl-benzofuran-2-carboxylic acid methyl ester with 40 g. of 2-bromo-2-bromomethyl-butyryl chloride, the crude 2,3-dihydro-5-(2-bromo-2-bromomethyl-butyryl) - 6 - chloro-7-methyl-benzofuran-2-carboxylic acid methyl ester, 4.7 g. of which are converted with 20 g. of potassium iodide to 1.6 g. of 2,3-dihydro-5-(2-methylene-butyryl) - 6 - chloro-7-methyl-benzofuran-2-carboxylic acid methyl ester, M.P. 57–61° (from methanol/water); yield 52% of theory.

(d) From 20.6 g. of 2,3-dihydro-6-methyl-benzofuran-2-carboxylic acid ethyl ester with 40 g. of 2-bromo-2-bromomethyl-butyryl-chloride, crude 2,3-dihydro - 5 - (2-bromo-2-bromomethyl-butyryl)-benzofuran - 2 - carboxylic acid ethyl ester, 4.5 g. of which can be converted, with 10 g. of potassium iodide into 1.3 g. of 2,3-dihydro-5-(2-methylene-butyryl)-6-methyl - benzofuran - 2 - carboxylic acid ethyl ester M.P. 40–41°; yield 45% of theory; and (e) From 31.8 g. of 2,3-dihydro-6-methyl-benzofuran-2-carboxylic acid decyl ester with 40.0 g. of 2-bromo-2-bromomethyl butyryl chloride, crude 2,3-dihydro - 5 - (2-bromo-2-bromomethyl-butyryl) - 6 - methyl - benzofuran-2-carboxylic acid decyl ester 5.6 g. of which can be converted with 10 g. of potassium iodide to give 1.55 g. of 2,3-dihydro-5-(2-methylene-butyryl) - 6 - methyl - benzofuran-2-carboxylic acid decyl ester, B.P. 227°/0.05 torr; yield 39% of theory.

EXAMPLE 15

(a) Analogously to Example 1(c), 26 g. of 2,3-dihydro-5-(2-methylene-butyryl)-6 - methyl - benzofuran - 2 - carboxylic acid and an ethereal diazomethane solution yield 26 g. of 2,3-dihydro-5-(2-methylene - butyryl) - 6 - methyl-benzofuran-2-carboxylic acid methyl ester, B.P. 158–161°/0.06 torr; yield 95% of theory.

The starting material, 2,3 - dihydro - 5 - (2 - methylene-butyryl)-6-methyl 1 - benzofuran - 2 - carboxylic acid, is produced as follows:

(b) Analogously to Example 1(d), 17.8 g. of 2,3-dihydro-6-methyl-benzofuran - 2 - carboxylic acid are reacted with 16 g. of butyryl chloride and 50 g. of aluminium chloride to obtain 2,3-dihydro - 5 - butyryl - 6-methyl-benzofuran - 2 - carboxylic acid, M.P. 140–141° (from benzene).

(c) 24.8 g. of the carboxylic acid described under (b) are refluxed for 8 hours with stirring with 5.1 g. of paraformaldehyde and 10.2 g. of dimethylamine hydrochloride in 150 ml. of dioxane. The reaction mixture is then evaporated under vacuum. To the resultant crude 2,3-dihydro-5-(2-dimethylaminomethyl-butyryl) - 6 - methyl - benzofuran-2-carboxylic acid hydrochloride, there are added 26 g. of anhydrous sodium acetate and 250 ml. of glacial acetic acid. The resultant mixture is refluxed with stirring for 2 hours and then evaporated under vacuum. The residue is stirred with 100 ml. of water, the suspension obtained is adjusted to a pH of 2 with concentrated hydrochloric acid and stirred for one hour at 20°. The organic acid is extracted by shaking three times with 150 ml. of ether. The ether solution is dried over sodium sulphate and concentrated by evaporation. The residue is recrystallized from cyclohexane and xylene/hexane, whereupon the 2,3-dihydro-5-(2-methylene - butyryl) - 6-methyl-benzofuran-2-carboxylic acid melts at 100–102°.

EXAMPLE 16

Aanalogously to Example 15(a–c), the following intermediate and end products are obtained:

(a) Starting from 2,3-dihydro-6-methyl-benzofuran-2-carboxylic acid via the intermediate products 2,3-dihydro-5 - (3-methyl-butyryl)-6-methyl-benzofuran-2-carboxylic acid, M.P. 131–132° (from benzene), crude 2,3-dihydro-5 - (2-dimethylaminomethyl-3-methyl-butyryl)-6-methyl-benzofuran-2-carboxylic acid, and 2,3-dihydro-5-(2-methylene - 3 - methyl-butyryl) - 6-methyl-benzofuran-2-carboxylic acid, M.P. 116° (from ethyl acetate), the end product 2,3-dihydro-5-(2-methylene-3-methyl-butyryl)-6-methyl-benzofuran - 2-carboxylic acid methyl ester, B.P. 145–147°/0.005 torr; yield of the final product starting from 27.4 g. of the corresponding carboxylic acid is 27 g., 94% of theory;

(b) Starting from 2,3-dihydro-6,7-dimethyl-benzofuran-2-carboxylic acid via the intermediate products 2,3-dihydro - 5-butyryl-6,7-dimethyl-benzofuran-2-carboxylic acid, M.P. 148° (from ethyl acetate), crude 2,3-dihydro-5-(2-dimethylaminomethyl-butyryl) - 6,7-dimethyl-benzofuran-2-carboxylic acid, and 2,3-dihydro-5-(2-methylene-butyryl)-6,7-dimethylbenzofuran-2-carboxylic acid, M.P. 104° (from carbon tetrachloride), the end product 2,3-dihydro-5 - (2-methylene-butyryl)-6,7-dimethyl-benzofuran-2-carboxylic acid methyl ester, M.P. 50° (from methanol/water); yield of the final product starting from 27.4 g. of the corresponding carboxylic acid is 28 g., 97% of theory; and (c) Starting from 2,3-dihydro-6-chloro-7-methyl-benzofuran-2-carboxylic acid via the intermediate products 2,3-dihydro - 5 - butyryl-6-chloro-7-methyl-benzofuran-2-carboxylic acid, M.P. 151° (from ethyl acetate), crude 2,3-dihydro - 5-(2-dimethylaminomethyl-butyryl)-6-chloro-7-methyl-benzofuran-2-carboxylic acid, and 2,3-dihydro-5-(2 - methylene-butyryl)-6-chloro-7-methyl-benzofuran-2-carboxylic acid, M.P. 153° (from carbon tetrachloride), the end product 2,3-dihydro-5-(2-methylene-butyryl)-6-chloro - 7 - methyl-benzofuran-2-carboxylic acid methyl ester, M.P. 57–61° (from methanol/water); yield of final product starting from 29.4 g. of the corresponding carboxylic acid is 29 g., 94% of theory.

EXAMPLE 17

Analogously to Example 2(b), 26 g. of 2,3-dihydro-5-(2 - methylene-butyryl)-6-methyl-benzofuran-2-carboxylic acid are converted with 62.5 g. of oxalyl chloride to the crude 2,3-dihydro-5-(2-methylene-butyryl)-6-methyl-benzofuran-2-carbonyl chloride, which with 20 g. of cyclohexanol in the presence of 13 g. of N,N-diisopropyl-ethylamine yields 2,3-dihydro-5-(2-methylene-butyryl)-6-methyl-benzofuran - 2-carboxylic acid cyclohexyl ester, B.P. 187–190°/0.05 torr; yield 25 g., 73% of theory.

EXAMPLE 18

2.6 g. of 2,3-dihydro-5-(2-methylene-butyryl)-6-methyl-benzofuran-2-carboxylic acid are refluxed for one hour with 10 ml. of ethanol and 0.20 g. of concentrated sulphuric acid. The reaction mixture is then cooled, 100 ml. of 2 N sodium hydrogen carbonate solution are added, and the crude product is extracted with ether. The ethereal solution is dried over sodium sulphate and concentrated by evaporation. After recrystallization from ethanol/water, the 2,3-dihydro-5-(2-methylene-butyryl)-6-methyl-benzofuran-2-carboxylic acid ethyl ester melts at 40–41°; yield 2.3 g., 7.5% of theory.

EXAMPLE 19

5.2 g. of 2,3-dihydro-5-(2-methylene-butyryl)-6-methyl-benzofuran-2-carboxylic acid are refluxed for one hour with 20 ml. of 2-hexanol and 0.40 g. of concentrated sulphuric acid. The reaction mixture is then cooled, 200 ml. of 2 N sodium hydrogen carbonate solution are added, and the crude product is extracted with ether. The ethereal solution is dried over sodium sulphate and concentrated by evaporation. The 2,3-dihydro-5-(2-methylene-butyryl)-6-methyl-benzofuran-2-carboxylic acid 2-hexyl ester boils at 166–170°/0.03 torr; yield 3.6 g., 51% of theory.

EXAMPLE 20

(a) 28.8 g. of 2,3-dihydro-5-(2-methylene-valeryl)-6,7-dimethyl-benzofuran-2-carboxylic acid yield, analogously to Example 1(c) with ethereal diazomethane 29 g. of 2,3-dihydro - 5 - (2-methylene-valeryl)-6,7-dimethyl-benzofuran-2-carboxylic acid methyl ester B.P. 153°/0.035 torr; yield 97% of theory.

The starting material is prepared as follows:

(b) To 27.2 g. of the 2,3-dihydro-6,7-dimethyl-benzofuran-2-carboxylic acid obtained in Example 7(d) are added 135 ml. of nitrobenzene. To this mixture are then added portionwise in the course of 30 minutes, with stirring and cooling, 69.5 g. of aluminium chloride, so that the temperature does not exceed 10°. At the same temperature are added dropwise, within 30 minutes, 25.3 g. of valeryl chloride. The reaction mixture is then further stirred for 5 hours in an ice bath; it is afterwards allowed to stand for 16 hours at room temperature, heated for a further hour to 40°, and then poured onto 500 g. of ice. To the obtained suspension are added 50 ml. of concentrated hydrochloric acid. After the aluminium chloride complex has decomposed, the reaction mixture is extracted three times with 150 ml. of ether each time. The ether extract is dried over sodium sulphate, and concentrated by evaporation. The residue is suspended in hexane, shaken up, separated from the hexane, and recrystallised from ethyl acetate/hexane. The obtained 2,3-dihydro-5-valeryl-6,7-dimethylbenzofuran-2-carboxylic acid melts at 128–129°.

(c) The carboxylic acid obtained in (b) is refluxed with 4.1 g. of paraformaldehyde and 8.2 g. of dimethylamine hydrochloride in 125 ml. of dioxane for 8 hours while stirring is maintained. The reaction mixture is then concentrated in vacuo. To the obtained crude 2,3-dihydro-5-(2 - dimethylaminomethyl-valeryl) - 6,7-dimethylbenzofuran-2-carboxylic acid hydrochloride are added 21 g. of anhydrous sodium acetate and 200 ml. of glacial acetic acid. The obtained mixture is refluxed, with stirring, for 2 hours, and is then concentrated in vacuo. The residue is mixed by stirring with 100 ml. of water; the obtained suspension is adjusted with concentrated hydrochloric acid to pH 2, and stirred for one hour at 20°. The organic acid is extracted by the suspension being shaken out three times with 150 ml. of ether. The ether solution is dried over sodium sulphate, and concentrated by evaporation. The residue is recrystallised from heptane, whereupon the 2,3-dihydro-5-(2-methylene-valeryl)-6,7-dimethylbenzofuran-2-carboxylic acid melts at 82°.

EXAMPLE 21

Analogously to Example 1(c) are obtained from 31.6 g. of 2,3-dihydro-5-(2-methylene-octanoyl) - 6 - methyl-benzofuran-2-carboxylic acid and ethereal diazomethane 31 g. of 2,3-dihydro-5-(2-methylene-octanoyl)-6-methyl-benzofuran-2-carboxylic acid methyl ester B.P. 160°/0.015 torr; yield 94% of theory.

EXAMPLE 22

28.8 g. of 2,3-dihydro - 5 - (2-methylene-hexanoyl)-6-methyl-benzofuran-2-carboxylic acid are suspended in 180 ml. of benzene. 4.5 g. of phosphorous trichloride dissolved in 60 ml. of benzene is then added dropwise to the suspension within 5 minutes at room temperature and the mixture is refluxed for 1 hour. The reaction mixture is cooled, filtered over "Hyflo" (purified diatomaceous earth) and evaporated in vacuo. The residue is taken up in 100 ml. of benzene, a mixture of 8.0 ml. of butanol and 13.0 g. of N,N-diisopropyl-ethylamine is added dropwise and the resulting mixture is refluxed for 1 hour. The reaction mixture is cooled and poured onto ice and the crude product is extracted with ether. The ether solution is washed with water, 2 N hydrochloric acid, saturated aqueous sodium hydrogen carbonate and again with water, dried over sodium sulphate and evaporated. Distillation of the residue gives 21 g. of 2,3-dihydro-5-(2-methylene-hexanoyl)-6-methyl - benzofuran-2-carboxylic acid butyl ester B.P. 162°/0.035 torr; yield 61% of theory.

EXAMPLE 23

Analogously to Example 22 is obtained from 26 g. of 2,3-dihydro-5-(2 - methylene-butyryl) - 6 - methyl-benzofuran-2-carboxylic acid and 4.5 g. phosphorous trichloride the crude carbonyl chloride which, with 13.0 g. N,N-diisopropylethylamine and 9.0 g. of cyclopentanol yields 25 g. of 2,3-dihydro-5-(2-methylene-butyryl)-6-methyl-benzofuran-2-carboxylic acid cyclopentyl ester B.P. 164–6°/0.04 torr; yield 72% of theory.

EXAMPLE 24

Analogously to Example 11 is obtained from 7.6 g. of 2,3-dihydro-6-methyl-benzofuran-2-carboxylic acid methyl ester, 40 ml. of nitrobenzene, 20. g. of powdered aluminium chloride and 95.2 g. of 2-methyl-acrylic acid anhydride [cf. T. K. Brotherton et al., J. Oreg. Chem. 26, 283 (1961)], 6.3 g. of 2,3-dihydro-5-(2-methylene-propionyl)-6-methyl-benzofuran-2-carboxylic acid methyl ester M.P. 65° (from methanol/water); yield 61% of theory.

What is claimed is:
1. A compound of the formula

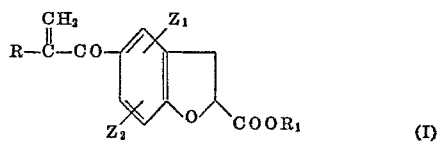

wherein

R is alkyl having at most 6 carbon atoms, $R_1$ is alkyl having at most 10 carbon atoms or cycloalkyl having from 5 to 7 carbon atoms, $Z_1$ and $Z_2$, independently of each other, are hydrogen chloro, fluoro, bromo, methyl, ethyl, methoxy or ethoxy.

2. A compound according to claim 1 which is 2,3-dihydro-5-(2 - methylene-butyryl)-6-methyl - benzofuran-2-carboxylic acid methyl ester.

3. A compound according to claim 1 which is 2,3-dihydro-5-(2 - methylene-butyryl)-6-methyl - benzofuran-2-carboxylic acid ethyl ester.

4. A compound according to claim 1 which is 2,3-dihydro-5-(2 - methylene - butyryl)-6-methyl-benzofuran-2-carboxylic acid decyl ester.

5. A compound according to claim 1 which is 2,3-dihydro-5-(2-methylene - butyryl)-6,7-dimethyl-benzofuran-2-carboxylic acid methyl ester.

References Cited
FOREIGN PATENTS 1,927,452  12/1969  Germany.

ALEX MAZEL, Primary Examiner

B. DENTZ, Assistant Examiner

U.S. Cl. X.R.

260—330.5; 424—285, 275